United States Patent
Kim et al.

(10) Patent No.: US 9,962,727 B2
(45) Date of Patent: May 8, 2018

(54) SLOT DIE WITH IMPROVED CHAMBER STRUCTURE AND COATING APPARATUS HAVING THE SAME

(71) Applicant: LG Chem, Ltd., Seoul (KR)

(72) Inventors: Jin-Woo Kim, Daejeon (KR); Jong-Hun Kim, Daejeon (KR); Joo-Sung Lee, Daejeon (KR)

(73) Assignee: LG Chem, Ltd. (KP)

( * ) Notice: Subject to any disclaimer, the term of this patent is extended or adjusted under 35 U.S.C. 154(b) by 854 days.

(21) Appl. No.: 14/446,435

(22) Filed: Jul. 30, 2014

(65) Prior Publication Data

US 2014/0331923 A1    Nov. 13, 2014

Related U.S. Application Data

(63) Continuation of application No. PCT/KR2013/011316, filed on Dec. 6, 2013.

(30) Foreign Application Priority Data

Dec. 7, 2012    (KR) .................. 10-2012-0142019

(51) Int. Cl.
*B05C 5/02*    (2006.01)
*H01M 4/04*    (2006.01)

(52) U.S. Cl.
CPC .......... *B05C 5/0262* (2013.01); *B05C 5/0254* (2013.01); *B05C 5/0245* (2013.01);
(Continued)

(58) Field of Classification Search
CPC ... B05C 5/0262; B05C 5/0254; B05C 5/0245; H01M 4/0409; H01M 4/0404; Y10T 137/8593
See application file for complete search history.

(56) References Cited

U.S. PATENT DOCUMENTS 3,595,204 A * 7/1971 McIntyre ............. B05C 5/0254
                                                118/674
4,667,879 A    5/1987 Muller
(Continued)

FOREIGN PATENT DOCUMENTS

CN    1756605 A    4/2006
CN    102405544 A    4/2012
(Continued)

OTHER PUBLICATIONS

Extended Search Report from European Application No. 13861017.5, dated Dec. 16, 2015.
(Continued)

*Primary Examiner* — Jeffrie R Lund
(74) *Attorney, Agent, or Firm* — Lerner, David, Littenberg, Krumholz & Mentlik, LLP

(57) ABSTRACT

Disclosed is a slot die, which includes a feed unit for introducing a coating material, a chamber for accommodating a coating material supplied through the feed unit, a slit communicating with the chamber to discharge the coating material, and a die body having die lips which form the slit, wherein the chamber includes a chamber block which has an inner space for accommodating the coating material and is configured so that the entire block is exchangeable with respect to the die body, and wherein a coating width is determined by a width of the inner space of the chamber block.

8 Claims, 4 Drawing Sheets

(52) U.S. Cl.
CPC ........ *H01M 4/0404* (2013.01); *H01M 4/0409* (2013.01); *Y10T 137/8593* (2015.04)

(56) References Cited

U.S. PATENT DOCUMENTS

| | | | | |
|---|---|---|---|---|
| 5,421,921 | A | * | 6/1995 | Gill ................. B05C 5/0254 |
| | | | | 156/244.11 |
| 5,500,274 | A | | 3/1996 | Francis et al. |
| 5,516,273 | A | | 5/1996 | Delmore et al. |
| 5,538,754 | A | * | 7/1996 | Sandock ............... B05B 15/02 |
| | | | | 118/410 |
| 2004/0247794 | A1 | * | 12/2004 | Tokimasa ............. B05C 5/0254 |
| | | | | 427/421.1 |
| 2006/0096528 | A1 | * | 5/2006 | Kawatake ............. B05C 5/0262 |
| | | | | 118/407 |
| 2008/0274222 | A1 | | 11/2008 | Cloeren |
| 2008/0274223 | A1 | | 11/2008 | Cloeren |
| 2011/0244144 | A1 | | 10/2011 | Uchida |
| 2011/0272832 | A1 | * | 11/2011 | Neavin ............... B29C 47/0021 |
| | | | | 264/1.7 |
| 2014/0331923 | A1 | * | 11/2014 | Kim ................... B05C 5/0254 |
| | | | | 118/324 |
| 2016/0114340 | A1 | * | 4/2016 | Choi ................... H01M 4/0404 |
| | | | | 239/135 |

FOREIGN PATENT DOCUMENTS

| | | |
|---|---|---|
| CN | 102527575 A | 7/2012 |
| EP | 0530751 A1 | 3/1993 |
| JP | S6291267 A | 4/1987 |
| JP | H0584458 A | 4/1993 |
| JP | H07171467 A | 7/1995 |
| JP | H10314642 A | 12/1998 |
| JP | 2002066420 A | 3/2002 |
| JP | 2005028227 A | 2/2005 |
| JP | 2007125503 A | 5/2007 |
| JP | 2007260643 A | 10/2007 |
| JP | 2008036624 A | 2/2008 |
| KR | 20040084013 A | 10/2004 |
| KR | 20070092384 A | 9/2007 |
| KR | 20110098578 A | 9/2011 |
| TW | 201201992 A | 1/2012 |

OTHER PUBLICATIONS

International Search Report for PCT/KR2013/011316 dated Apr. 3, 2014.

* cited by examiner (a)  (b)

(a)

(b)

(c)

SLOT DIE WITH IMPROVED CHAMBER STRUCTURE AND COATING APPARATUS HAVING THE SAME

CROSS-REFERENCE TO RELATED APPLICATION

The present application is a continuation of International Application No PCT/KR2013/011316 filed on Dec. 6, 2013, which claims priority to Korean Patent Application No. 10-2012-0142019 filed on Dec. 7, 2012 in the Republic of Korea, the disclosures of which are incorporated herein by reference.

TECHNICAL FIELD

The present disclosure relates to a slot die and a coating apparatus having the same, and more particularly, to a slot die in which a chamber structure for accommodating a coating material is provided at a die body, and a coating apparatus having the same.

BACKGROUND ART

Generally, a secondary battery includes a battery case, an electrolyte and an electrode assembly accommodated in the battery case.

The electrode assembly has a structure in which cathodes, separators and anodes are stacked in turns. The cathode and the anode of the electrode assembly respectively include current collectors made of aluminum foil (Al-foil) and copper foil (Cu-foil). The cathode current collector and the anode current collector are respectively coated with a cathode active material and an anode active material, and a region not coated with an active material, namely, a non-coated region, is connected to an electrode tab.

In order to obtain uniform charge/discharge characteristics of the secondary battery, the current collectors should be precisely coated with a cathode active material layer and an anode active material. For this, a slot-coating process is generally performed.

FIG. 1 shows a general slot die for performing a slot-coating process. As shown in FIG. 1, the slot die includes a feed unit 10 for introducing an active material coating solution, a chamber 11 for accommodating a coating material supplied by the feed unit 10, a slit 12 communicating with the chamber 11 to discharge the coating material, and die lips 13 which form the slit 12.

The coating solution flows into the chamber 11 through the feed unit 10, fills the chamber 11 and then discharges out through the slit 12.

The coating solution discharging through the slit 12 is successively coated onto a substrate. The active material coated onto the substrate has a coating width which is determined by the width of the slit 12.

A slot-coating apparatus is disclosed in Korean Unexamined Patent Publication No. 2011-0098578 and Korean Unexamined Patent Publication No. 2004-0084013.

Korean Unexamined Patent Publication No. 2011-0098578 discloses a method for designing an interior of a slot-coating die for successive and uniform coating of an electrode-coating catalyst slurry, which includes selecting a fluid model for analyzing flow characteristics of a fluid in a die from rheologic property information of a catalyst slurry fluid, determining a chamber shape in the slot-coating die in consideration of the rheologic characteristics of the catalyst slurry fluid, and determining a process condition for forming a catalyst layer of a uniform thickness. In addition, Korean Unexamined Patent Publication No. 2011-0098578 discloses a semi-cylindrical chamber having a center portion of a convex hanger shape in which a catalyst layer of a uniform thickness is formed by determining a width of the convex region.

Korean Unexamined Patent Publication No. 2004-0084013 discloses a precise coating apparatus and method for discharging a coating solution in an optimal condition by installing exchangeable lips of various shapes. Korean Unexamined Patent Publication No. 2004-0084013 discloses a precise coating apparatus including a fixed block, an upstream die and a downstream die respectively installed at an upstream die block and a downstream die block mounted to the fixed block, an upstream lip and a downstream lip exchangeably fixed to the upstream die and the downstream die, respectively, and a coating solution supply manifold.

When it is needed to change a coating width, in a general slot die, a design size of a shim plate which determines widths of a slit and an inner space of the chamber is adjusted to implement various coating widths. FIGS. 2a and 2b schematically show an example in which a size of a shim plate 14 inserted into a die body 15 is controlled to change a width of the inner space of the chamber 11, thereby adjusting the coating width. However, in this method, if the size of the shim plate 14 is adjusted to change over 10% of the coating width, the slurry cannot discharge out of a dead zone in the chamber 14, namely at both edge portions of the chamber 14, but stays thereat, and the accumulation of slurry and vortex may deteriorate the coating property and the uniform coating thickness.

In addition, in the general slot die, whenever the coating width is adjusted, the die body must also be newly designed and fabricated, which consumes much time and costs.

DISCLOSURE

Technical Problem

The present disclosure is designed to solve the problems of the related art, and therefore the present disclosure is directed to providing a slot die which is configured to prevent a dead zone from being generated in a chamber when a coating width is adjusted, and a coating apparatus having the same.

The present disclosure is also directed to providing a slot die whose structure may be easily changed when a coating width is changed, and a coating apparatus having the same.

Technical Solution

In one aspect of the present disclosure, there is provided a slot die, which includes a feed unit for introducing a coating material, a chamber for accommodating a coating material supplied through the feed unit, a slit communicating with the chamber to discharge the coating material, and a die body having die lips which form the slit, wherein the chamber includes a chamber block which has an inner space for accommodating the coating material and is configured so that the entire block is exchangeable with respect to the die body, and wherein a coating width is determined by a width of the inner space of the chamber block.

Preferably, the chamber block includes a block body, separately from the die body, and the block body is detachably assembled to the die body.

Preferably, chamber blocks whose inner spaces have different widths are provided for different coating widths, and the different chamber blocks have the same outer width.

The slot die may further include a shim plate which has an inner width corresponding to the width of the inner space of the chamber block and is fixed to the die body.

In another aspect of the present disclosure, there is provided a coating apparatus, which includes a slot die including a feed unit for introducing a coating material, a chamber having a chamber block in which an inner space is formed to accommodate a coating material supplied through the feed unit, a slit communicating with the chamber to discharge the coating material, and die lips which form the slit; a coating solution supply manifold for supplying a coating material to the slot die; and a coating roll disposed at the front of the slit to be spaced apart from the slit to carry a substrate to be coated, wherein the chamber block is installed so that the entire block is exchangeable with respect to a die body of the slot die, and wherein a coating width is determined by a width of the inner space of the chamber block.

Advantageous Effects

According to the present disclosure, a coating width may be conveniently changed by freely exchanging a chamber suitable for a desired coating width.

In addition, according to the present disclosure, it is possible to prevent a dead zone from be generated in the chamber.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings. In the drawings.

BEST MODE

Figure 1:
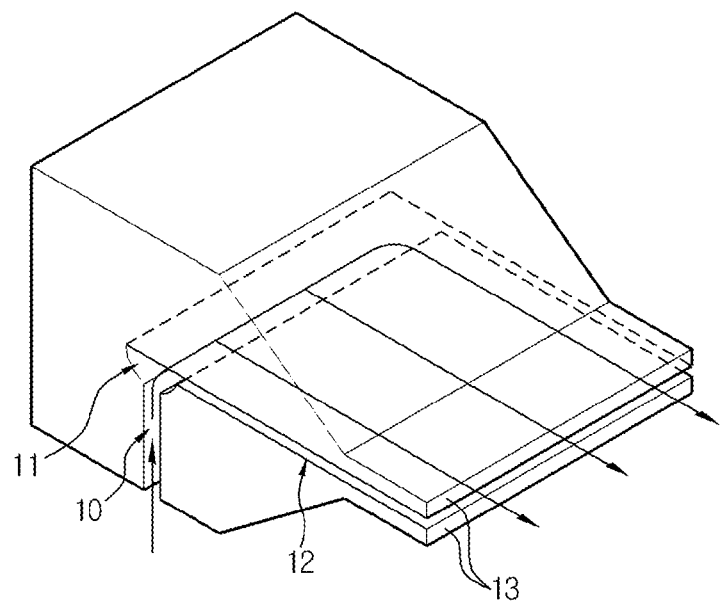
FIG. 1 is a perspective view schematically showing a general slot die.
Figure 2:
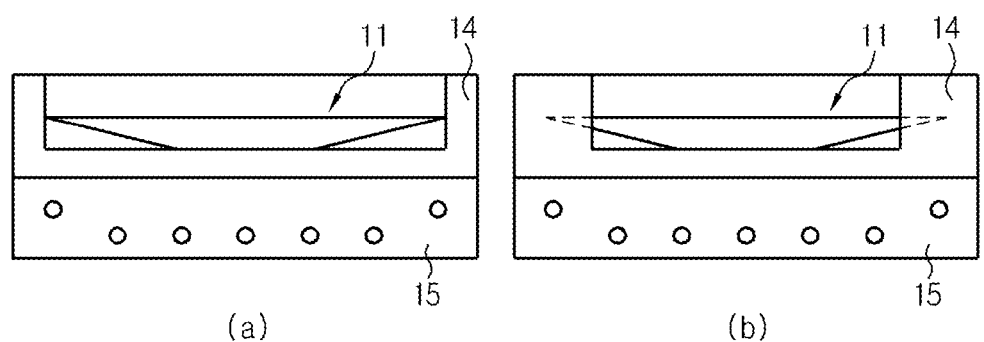
FIG. 2 is a plane view showing an example in which a coating width is adjusted by changing a size of a shim plate of the general slot die.
Figure 3:
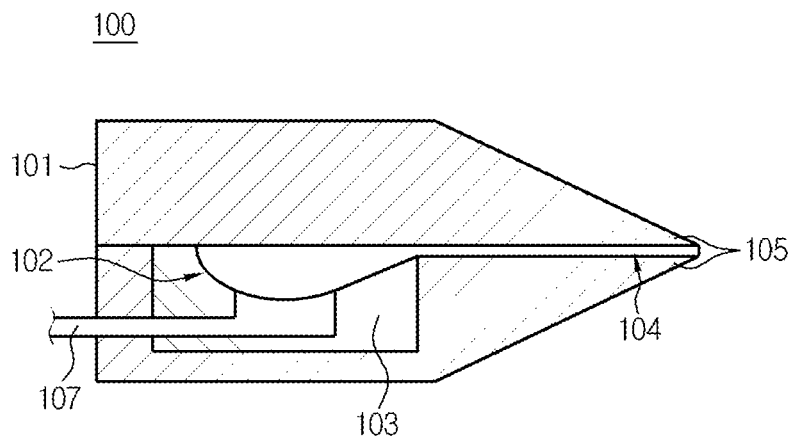
FIG. 3 is a cross-sectional view showing a slot die according to an embodiment of the present disclosure.

FIG. 3 is a cross-sectional view showing a slot die according to an embodiment of the present disclosure.

Referring to FIG. 3, a slot die 100 according to an embodiment of the present disclosure includes a feed unit 107 for introducing a coating material, a chamber 102 for accommodating a coating material supplied through the feed unit 107, a slit 104 communicating with the chamber 102, and die lips 105 which form the slit 104.

The feed unit 107 gives a passage for introducing a coating material into the die body 101 and preferably has a pipe shape. The coating material supplied through the feed unit 107 may be active material slurry for an electrode.

The chamber 102 includes a chamber block 103 in which an inner space is formed to serve as a buffer region for accommodating a coating material. The inner space formed in the chamber block 103 may have a substantially semi-cylindrical shape. The width of the inner space formed in the chamber block 103 corresponds to a width of the slit 104 communicating with the chamber 102, which also corresponds to a coating width. In other words, the width of the inner space formed in the chamber block 103 determines the coating width of the slot die 100.

Even though it is depicted that the chamber block 103 includes a part of the extension of the slit 104, the present disclosure is not limited thereto, and it is also possible that the chamber block 103 may be modified so that there is only the inner space having a semi-cylindrical shape in which a coating material is accommodated.

The chamber block 103 is configured to have a block body, separately from the die body 101, and the chamber block 103 is installed so that the entire chamber block 103 may be exchanged with respect to the die body 101. In detail, the chamber block 103 is inserted into an accommodation portion formed at the die body 101 and detachably assembled thereto by means of a predetermined coupling unit such as a bolt.

Figure 4:
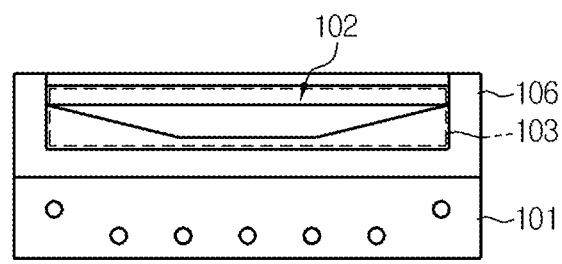
FIGS. 4 to 6 are plane views showing examples of a chamber block employed in the slot die of FIG. 3.
Figure 5:
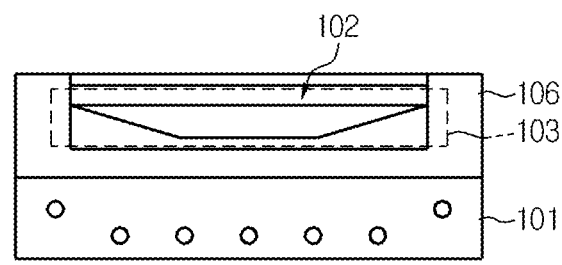
Figure 6:
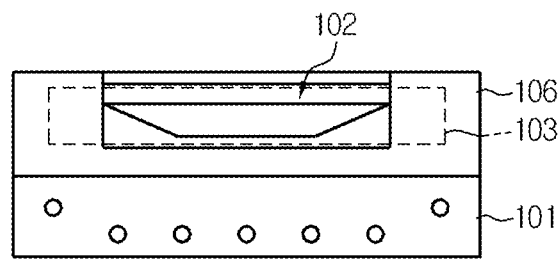

As shown in FIGS. 4 to 6, the chamber 102 installed to the die body 101 has chamber blocks 103 whose inner spaces have different widths for different coating widths. In other words, the width of the inner space of the chamber 102 may have various modifications corresponding to desired coating widths.

Figure 7:
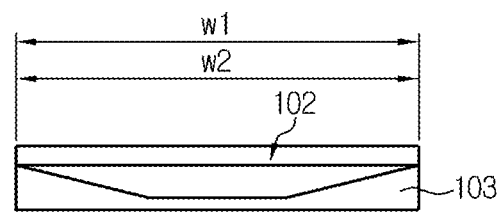
FIG. 7 is a plane view showing a relationship of sizes of the chamber blocks depicted in FIGS. 4 to 6.
Figure 7:
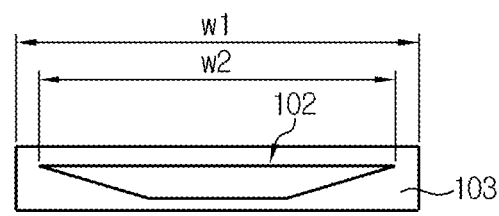
Figure 7:
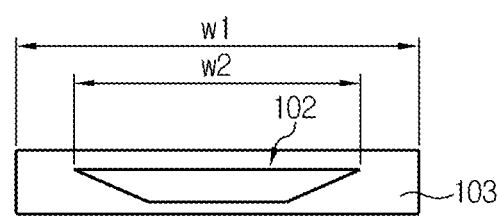

As shown in FIGS. 7a to 7c, even though the width w2 of the inner space of the chamber block 103 is modified variously, the outer width w1 of the chamber block 103 does not change. In other words, in order to implement the chamber 102 having an exchangeable structure, different chamber blocks 103 have the same outer width w1.

The shim plate 106 is inserted into and fixed to the die body 101 to support the chamber 102 and has an inner width corresponding to the width of the inner space of the chamber block 103.

Figure 8:
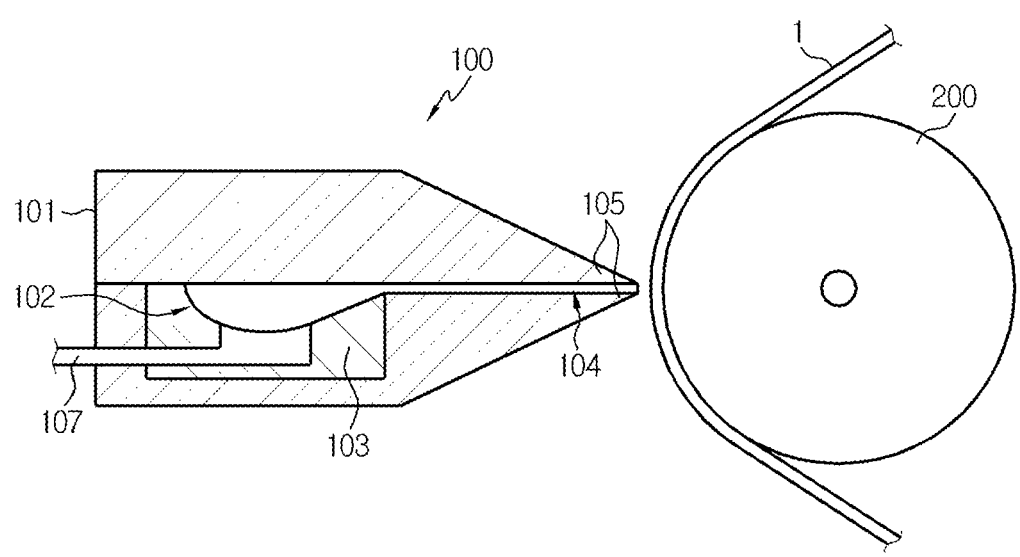
FIG. 8 is a side view schematically showing a coating apparatus according to an embodiment of the present disclosure.

FIG. 8 is a side view schematically showing a coating apparatus according to an embodiment of the present disclosure.

Referring to FIG. 8, the coating apparatus according to an embodiment of the present disclosure includes a slot die 100 having an exchangeable chamber 102 installed at the die body 101, a coating solution supply manifold (not shown) for supplying a coating material to the slot die 100, and a coating roll 200 disposed at the front of the slot die 100 and spaced apart from the slot die 100.

As described above, the slot die 100 includes a feed unit 107 for introducing a coating material, a chamber 102 in which an inner space is formed to accommodate a coating material supplied through the feed unit 107, a slit 104 communicating with the chamber 102 to discharge the coating material, and die lips 105 which give a small gap to form the slit 104.

The feed unit 107 may have a pipe shape and be assembled to the die body 101, and the coating solution supply manifold for supplying a coating material is coupled to the feed unit 107. The coating solution supply manifold may adopt any manifold available for a general coating apparatus, and thus is not described in detail here.

The chamber 102 includes a chamber block 103 in which the inner space for accommodating a coating material is formed. The chamber block 103 is configured to have a block body, separately from the die body 101, and is detachably assembled to the die body 101. The chamber block 103 may adopt various blocks whose inner spaces are different for different coating widths.

The coating roll 200 is disposed at the front of the slit 104 and spaced apart from the slit 104 to successively carry a substrate 1 to be coated.

The coating solution supplied by the coating solution supply manifold flows into the chamber 102 through the feed unit 107, fills the chamber 102 and then discharges through the slit 104 toward the coating roll 200. The coating solution discharging from the slit 104 is coated onto the substrate 1 which is successively carried by the coating roll 200.

If the coating width on the substrate 1 needs to be adjusted, the chamber block 103 should be separated from the die body 101 and exchanged with another chamber block 103 having a different inner width to easily change the coating width.

As described above, according to the present disclosure, the coating width may be conveniently changed by exchanging the chamber block 103 according to a desired coating width. In addition, since a dead zone is not generated in the chamber 102 even though the structure of the chamber 102 is changed, it is possible to form a uniform coating film.

INDUSTRIAL APPLICABILITY

If the present disclosure is applied, a coating width may be easily adjusted by exchanging a chamber without changing a design of a slot die. Therefore, it is possible to reduce time and costs consumed for redesigning and exchanging the slot die.

What is claimed is:

1. A slot die, which includes a feed unit for introducing a coating material, a chamber for accommodating a coating material supplied through the feed unit, a slit communicating with the chamber to discharge the coating material, and a die body having die lips which form the slit,
   wherein the chamber includes a chamber block having an inner space for accommodating the coating material, the inner space spaced apart from an entry point of the feed unit into the chamber block and the chamber block configured so that the entire chamber block is disposed in the chamber and is exchangeable with respect to the die body,
   wherein a coating width is determined by a width of the inner space of the chamber block,
   wherein the chamber block includes a block body, separately from the die body, and the block body is detachably assembled to the die body, and
   wherein chamber blocks whose inner spaces have different widths are provided for different coating widths, and the different chamber blocks have the same outer width.

2. The slot die according to claim 1, further comprising a shim plate which has an inner width corresponding to the width of the inner space of the chamber block and is fixed to the die body.

3. The slot die according to claim 2, wherein the coating width is adjusted by exchanging the chamber block and the shim plate.

4. The slot die according to claim 1, wherein the inner space of the chamber block is at least partially defined by a concave surface.

5. A coating apparatus, comprising:
   a slot die including a feed unit for introducing a coating material, a chamber having a chamber block in which an inner space is formed to accommodate a coating material supplied through the feed unit, a slit communicating with the chamber to discharge the coating material, and die lips which form the slit;
   a coating solution supply manifold for supplying a coating material to the slot die;
   and
   a coating roll disposed at the front of the slit to be spaced apart from the slit to
   carry a substrate to be coated,
   wherein the chamber block is installed so that the entire chamber block is exchangeable with respect to a die body of the slot die,
   wherein the inner space is spaced apart from an entry point of the feed unit into the chamber block,
   wherein a coating width is determined by a width of the inner space of the chamber block,
   wherein the chamber block includes a block body, separately from the die body, and the block body is detachably assembled to the die body, and
   wherein chamber blocks whose inner spaces have different widths are provided for different coating widths, and the different chamber blocks have the same outer width.

6. The coating apparatus according to claim 5, further comprising a shim plate which has an inner width corresponding to the width of the inner space of the chamber block and is fixed to the die body.

7. The coating apparatus according to claim 6, wherein the coating width is adjusted by exchanging the chamber block and the shim plate.

8. The coating apparatus according to claim 5, wherein the inner space of the chamber block is at least partially defined by a concave surface.

* * * * *